US 11,575,547 B2

(12) United States Patent
Hoydis et al.

(10) Patent No.: US 11,575,547 B2
(45) Date of Patent: Feb. 7, 2023

(54) DATA TRANSMISSION NETWORK CONFIGURATION

(71) Applicant: Nokia Technologies Oy, Espoo (FI)

(72) Inventors: Jakob Hoydis, Paris (FR); Sebastian Cammerer, Tubingen (DE); Sebastian Dörner, Bad Mergentheim (DE)

(73) Assignee: Nokia Technologies Oy, Espoo (FI)

( * ) Notice: Subject to any disclaimer, the term of this patent is extended or adjusted under 35 U.S.C. 154(b) by 519 days.

(21) Appl. No.: 16/623,072

(22) PCT Filed: May 15, 2018

(86) PCT No.: PCT/EP2018/062479
§ 371 (c)(1),
(2) Date: Dec. 16, 2019

(87) PCT Pub. No.: WO2018/233932
PCT Pub. Date: Dec. 27, 2018

(65) Prior Publication Data
US 2020/0177418 A1 Jun. 4, 2020

(30) Foreign Application Priority Data
Jun. 19, 2017 (EP) .................................... 17176534

(51) Int. Cl.
*H04L 25/03* (2006.01)
*G06N 3/04* (2006.01)
(Continued)

(52) U.S. Cl.
CPC ..... *H04L 25/03165* (2013.01); *G06N 3/0454* (2013.01); *G06N 3/08* (2013.01);
(Continued)

(58) Field of Classification Search
CPC ........... H04L 25/03165; H04L 25/0212; H04L 25/03834; H04L 27/2647; G06N 3/0454; G06N 3/08
See application file for complete search history.

(56) References Cited

U.S. PATENT DOCUMENTS

| 6,339,612 | B1 * | 1/2002 | Stewart ................ H04B 1/7105 375/150 |
| 2014/0376669 | A1 | 12/2014 | Dhadesugoor et al. |
| 2016/0248610 | A1 | 8/2016 | Dhadesugoor et al. |

OTHER PUBLICATIONS

International Search Report and Written Opinion in corresponding PCT Application No. PCT/EP2018/062479, dated Dec. 27, 2018, 10 pages.
(Continued)

*Primary Examiner* — Natasha W Cosme
(74) *Attorney, Agent, or Firm* — Tong, Rea, Bentley & Kim, LLC

(57) ABSTRACT

A method and devices for configuring a data transmission network are disclosed. The method is for configuring a data transmission network, executed by a configuration device, wherein the data transmission network comprises at least one transmitter, at least one receiver with a communication channel between the transmitter and the receiver, the method comprising: training a machine learning model of the data transmission network, wherein the machine learning model comprises at least a transmitter model including a transmitter neural network, a channel model, and a receiver model including a receiver neural network by providing a message within a sequence of messages; generating a group of transmission symbols for each message in the sequence of messages using the transmitter neural network; concatenating the groups of transmission symbols together as a sequence of transmission symbols; simulating transmission of the sequence of transmission symbols over the commu-
(Continued)

nication channel using the channel model to the receiver; analysing a sequence of received symbols using the reception neural network to generate a decoded message; and updating the machine learning model based on an output of said reception neural network. In this way, the machine learning model can be trained using representative sequences of message, which improves performance when deployed in a real network.

20 Claims, 4 Drawing Sheets

(51) Int. Cl.
    *G06N 3/08*          (2006.01)
    *H04L 25/02*        (2006.01)
    *H04L 27/26*        (2006.01)

(52) U.S. Cl.
    CPC .... *H04L 25/0212* (2013.01); *H04L 25/03834* (2013.01); *H04L 27/2647* (2013.01)

(56) References Cited

OTHER PUBLICATIONS

O'Shea, T. et al., "An Introduction to Machine Learning Communications Systems," arxiv.org, Cornell University Library, XP080746465, Feb. 2, 2017, 11 pages.

* cited by examiner

DATA TRANSMISSION NETWORK CONFIGURATION

CROSS-REFERENCE TO RELATED APPLICATIONS

This application is based on and claims the benefit of International Patent Application No. PCT/EP2018/062479, filed on May 15, 2018, which claims priority to European Patent Application No. 17176534.0, filed on Jun. 19, 2017, both of which are hereby incorporated herein by reference in their entirety.

FIELD OF THE INVENTION

The present invention relates to the field of telecommunication. In particular, the present invention relates to a method and devices for configuring a data transmission network.

BACKGROUND

In known transmission networks, a transmitter is composed of multiple processing blocks that carry out well-defined and isolated functions, such as source and channel coding, modulation, pulse shaping, digital-to-analogue conversion (DAC) conversion, mixing on a radio/optical carrier, and amplification. Likewise, a receiver consists of similar blocks in reverse order, namely amplification, down conversion, analogue-to-digital conversion (ADC), matched filtering, decimation, equalization, demodulation, channel and source decoding. In such transmission networks, each functional block is designed and optimized individually, which may not result in the best end-to-end performance.

From a high-level perspective, each of the transmitter, channel and receiver of a transmission networks transforms an input vector into an output vector, and can hence be modelled as a neural network. Since a chain of neural networks is again an even larger neural network, it has been proposed to model an entire transmission network as a neural network auto-encoder. Such a network can be trained from end-to-end in a supervised manner, to achieve a better end-to-end performance.

Although end-to-end training of communications networks is quite appealing from a theoretical point of view, it suffers from the fundamental practical problem that during the learning process the gradient of the network communications channel must be computed, i.e., if one slightly changes the input, what would be the effect on the output. Known solutions consist of training the neural network for a stochastic channel model for which the gradient can be computed. However, if the resulting learned transceiver is used on real hardware and communications takes place over a real channel, the performance is generally unsatisfactory due to the mismatch between the channel model used during training and the real channel.

SUMMARY

According to a first aspect, there is provided a method for configuring a data transmission network, executed by a configuration device, wherein the data transmission network comprises at least one transmitter, at least one receiver with a communication channel between the transmitter and the receiver, the method comprising: training a machine learning model of the data transmission network, wherein the machine learning model comprises at least a transmitter model including a transmitter neural network, a channel model, and a receiver model including a receiver neural network by providing a message within a sequence of messages; generating a group of transmission symbols for each message in the sequence of messages using the transmitter neural network; concatenating the groups of transmission symbols together as a sequence of transmission symbols; simulating transmission of the sequence of transmission symbols over the communication channel using the channel model to the receiver; analysing a sequence of received symbols using the reception neural network to generate a decoded message; and updating the machine learning model based on an output of the reception neural network.

The first aspect recognises that a problem with existing neural network approaches for configuring data transmission networks is that they utilise single messages during training, such training fails to accurately represent the actual operation of the network and so leads to lower than expected performance. In particular, the first aspect recognises that using single messages during training fails to optimize the models for the sequences of messages which are transmitted when deployed. Accordingly, a method is provided. The method may be for configuring or optimizing a data transmission network. The method may be performed by a configuration device. The data transmission network may comprise one or more transmitters. The data transmission network may comprise one or more receivers. The data transmission network may have a communication channel between each transmitter and each receiver. The method may comprise training a machine learning model of the data transmission network. The machine learning model may comprise one or more transmitter models. The transmitter models may include a transmitter neural network. The machine learning model may comprise a channel model. The machine learning model may comprise a receiver model. The receiver model may include a receiver neural network. The training may comprise providing sequences of messages within which is a message. The training may comprise generating a group, set or vector of transmission symbols for each message in the sequences of messages. The group of transmission symbols may be produced by the transmitter neural network. The training may include concatenating or joining the groups of transmission symbols together to form a sequence of transmission symbols. The training may include simulating the transmission of the sequence of transmission symbols to the receiver using the communication channel. The simulating may be performed by the channel model. The training may include analysing a sequence of received symbols which are received by the receiver over the communication channel. The analysing may be performed by the reception neural network. The reception neural network may generate a decoded message. The training may comprise updating the machine learning model based on an output of the reception neural network. In this way, the machine learning model can be trained using representative sequences of message, which improves performance when deployed in a real network.

In one embodiment, the output of the reception neural network comprises a probability set or vector corresponding to a probability distribution for each possible message.

In one embodiment, the decoded message corresponds to that message in the probability distribution having the greatest probability.

In one embodiment, the method comprises applying an inter-symbol interference function of the channel model to the sequence of transmission symbols to generate inter-message interference symbols as the sequence of received symbols. Accordingly, the sequence of transmission symbols may be subjected to inter-symbol interference, which reflects the inter-symbol interference which occurs during transmission in real networks. This helps to improve the performance of the machine learning model when deployed in a network which experiences such interference.

In one embodiment, the inter-symbol interference function reproduces interference between transmission symbols from different messages in the sequence of messages. Accordingly, the interference may extend between messages within the sequence of messages.

In one embodiment, the applying comprises applying a first inter-symbol interference function to the sequence of transmission symbols to generate first inter-message interference symbols as the sequence of received symbols. Accordingly, a first type of interference may be experienced by the symbols.

In one embodiment, the first inter-symbol interference function comprises a pulse-shaping or filtering function. It will be appreciated that pulse shaping can cause interference between symbols.

In one embodiment, the pulse-shaping function reproduces, simulates or models interference between transmission symbols introduced by a pulse-shaper.

In one embodiment, the applying comprises applying a second inter-symbol interference function to the sequence of transmission symbols to generate second inter-message interference symbols as the sequence of received symbols. Accordingly, a second type of interference may be experienced by the symbols, which may occur without the presence of the first type of interference.

In one embodiment, the second inter-symbol interference function comprises a convolution with a channel impulse response. Accordingly, interference caused by a channel impulse response may be applied to the symbols.

In one embodiment, the channel impulse function reproduces interference between transmission symbols introduced by a channel.

In one embodiment, the applying comprises applying the first inter-symbol interference function to the sequence of transmission symbols to generate first inter-message interference symbols and applying the second inter-symbol interference function to the first inter-message interference symbols to generate second inter-message interference symbols as the sequence of received symbols. Accordingly, the symbols may be subjected to both types of interference.

In one embodiment, each message comprises one of a plurality 'M' of different messages.

In one embodiment, each message is randomly-selected.

In one embodiment, each set of transmission symbols comprises a vector having 'n' entries.

In one embodiment, the sequence of messages comprises at plurality 'K' of sequential messages.

In one embodiment, the sequence of transmission symbols comprise 'n'×'K' symbols.

In one embodiment, the inter-message interference transmission signal comprises more than 'n'×'K' samples.

In one embodiment, the analysing comprises setting an observation window within the sequence of received symbols and classifying that portion of the sequence of received symbols falling within the observation window. Accordingly, an observation or sampling window may be provided which observes a number of samples of the received symbols and that portion of the sequence fallen within the observation window may be classified using the reception neural network.

In one embodiment, the method comprises adjusting a location of the observation window to maximise a classification accuracy of the decoded message. Accordingly, the position of the observation window may be moved or shifted with respect to the received symbols in order to improve the classification accuracy of the decoded message.

In one embodiment, the method comprises adjusting a size of the observation window to maximise a classification accuracy of the decoded message. Accordingly, the size or number of samples of symbols falling within the observation window may be changed in order to improve the classification accuracy of the decoded message.

In one embodiment, the method comprises estimating a characteristic of the sequence of received symbols using a characteristic estimating characteristic neural network, applying a compensation function to the sequence of received symbols based on the characteristic to generate compensated received symbols and analysing the compensated received symbols using the reception neural network to generate the decoded message. Accordingly, a characteristic or property of the received symbols may be estimated or determined using a neural network. The received symbols may be compensated for that characteristic and the received symbols with the compensation applied may be analysed to generate the decoded message. This helps to improve the performance of the machine learning model.

In one embodiment, the characteristic comprises at least one of a phase offset and a channel impulse response.

In one embodiment, the method comprises applying at least one of the phase offset and the channel impulse response to maximise classification accuracy of the decoded message.

In one embodiment, the method comprises updating the characteristic estimating neural network based on the output of the reception neural network.

In one embodiment, the machine learning model comprises the characteristic estimating neural network.

In one embodiment, the training of the machine learning model comprises training the machine learning model as an auto-encoder.

In one embodiment, the training the machine learning model comprises determining weights of the transmitter neural network and of the receiver neural network by applying a stochastic gradient descent algorithm to maximise classification accuracy of the decoded message.

In one embodiment, the method comprises deploying at least one of the transmitter neural network in the transmitter and the receiver neural network in the receiver.

In one embodiment, the method comprises configuring the transmitter and the receiver based on the trained machine learning model In one embodiment, the method comprises obtaining a training data specifying a set messages sent by the transmitter and the corresponding signals received by the receiver, training the receiver model based on the obtained training data, and configuring the receiver based on the trained receiver model.

In one embodiment, the training the machine learning model comprises training the machine learning model as an auto-encoder.

In one embodiment, the method comprises repeating the obtaining training data, training the receiver model and configuring the receiver.

In one embodiment, the method comprises obtaining the training data from the receiver.

In one embodiment, the training data has been determined by the receiver by: determining a sequence of received messages; and determining a sequence of transmitted messages by applying an error correction code to the sequence of received messages.

In one embodiment, the training the machine learning model comprises determining weights of the transmitter neural network and of the receiver neural network by applying a stochastic gradient descent algorithm.

In one embodiment, the transmitter neural network includes multiple dense layers followed by a normalization layer configured for applying one of: a normalization to a predetermined norm, scaling to a unit absolute value, convolution with a filter.

In one embodiment, the transmitter model includes the transmitter neural network and at least one other transmitter processing module, and/or the receiver model includes the receiver neural network at least one other receiver processing module.

According to a second aspect, there is provided a computer program product operable, when executed on a computer, to perform the method of the first aspect.

According to a third aspect, there is provided a source device comprising a transmitter configured according to the method of the first aspect.

According to a fourth aspect, there is provided a destination device comprising a receiver configured according to the method the first aspect.

According to a fifth aspect, there is provided a configuration device for a data transmission network, comprising means configured for performing the method of the first aspect.

According to a sixth aspect, there is provided a data transmission network, comprising at least one source device according the third aspect, at least one destination device according to the fourth aspect and a configuration device according to the fifth aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided. Embodiments provide a machine learning model which is trained using sequences of messages. Typically, sequences of messages having a plurality of randomly-selected messages are generated and provided to the machine learning model. The machine learning model uses these sequences of messages in its models. Providing sequences of messages to the models helps to improve the performance of those models when deployed in real networks. Typically, those models generate inter-symbol interference and that inter-symbol interference extends between messages within each sequence of messages, which improves the performance of the models when experiencing such inter-message interference in real networks. By using sequences of messages, it is also possible to identify characteristics of the received symbols, such as any phase offset or channel impulse response. These can then be compensated for, in order to improve the performance of the models. Once those models have been trained they can be deployed within the network itself. Thereafter, periods of retraining can occur in order to optimize the deployed models in the real network.

Figure 1:
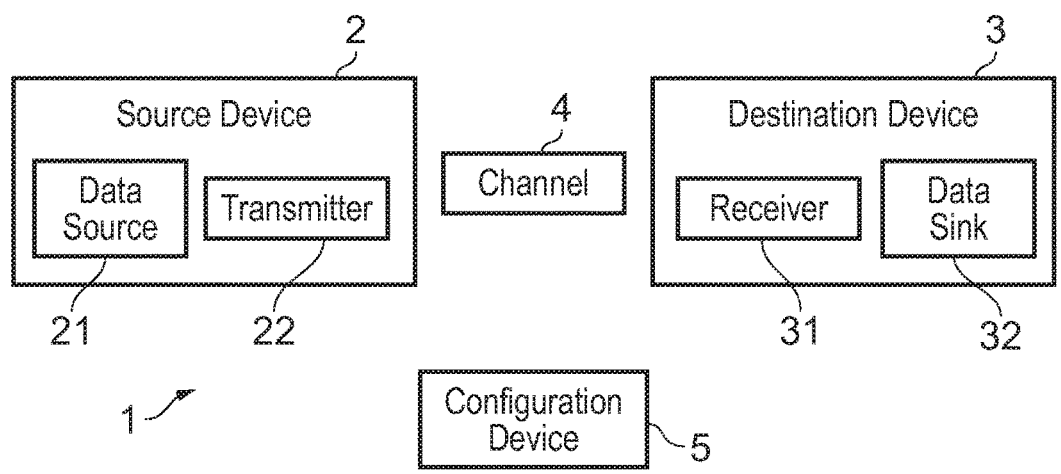
FIG. 1 is a block diagram of a data transmission network according to one embodiment.

FIG. 1 is a block diagram of a data transmission network, generally 1. The data transmission network 1 comprises a source device 2, a destination device 3, a communication channel 4 connecting the source device 2 to the destination device 3, and a configuration device 5. The data transmission network 1 allows for transferring data from the source device 2 to the destination device 3.

The source device 2 comprises a data source 21 and a transmitter 22. The data source 21 is configured to provide data that is used by the data transmission network 1. The data source 21 may include for example at least one of: a sensor, a user interface, a local memory, a network interface, etc. The data provided by the data source 21 may include at least one of: digital images, video and audio files, data coming from sensors, radars, telescopes, radio receivers, etc. The transmitter 22 is configured to process the data provided by the data source 21 and to output the processed data to the communication channel 4 for transmission to the destination device 3. The transmitter 22 comprises a configurable part which may be configured by the configuration device 5 according to the method described hereafter with reference to FIGS. 2 to 6.

The source device 2 may present the hardware architecture of a computer and may be for example one of: a user device (laptop, smart phone, wearable activity tracker, etc.), a network equipment (cellular radio station, router, cloud server, etc.), a monitoring device (camera, Internet of Things sensor, etc.).

The destination device 3 comprises a receiver 31 and a data sink 32. The receiver 31 processes the data received from the source device 2 through the communication channel 4 to produce an output to the data sink 33. The receiver 31 comprises a configurable part which may be configured by the configuration device 5 according to the method described hereafter with reference to FIGS. 2 to 6.

The data sink 3 receives the output of the receiver 31 and may include for example one of: a user interface (display, audio speaker, etc.), a local memory, a network interface, etc.

The destination device 3 may present the hardware architecture of a computer and may be for example one of: a user device (laptop, smart phone, etc.), a network equipment (cellular radio station, router, cloud server, etc.), a monitoring device (camera, Internet of Things sensor, etc.).

The communication channel 4 provides a physical link between the transmitter 22 of the source device 2 and the receiver 31 of the destination device 3. The communication channel 4 is for example a radio link, a coaxial cable, a twisted pair cable, optical fibre, etc. In some embodiments, the communication channel 4 comprises multiple orthogonal channels (in time/frequency/space) that are used in parallel.

The configuration device 5 is configured for training a machine-learning model 6 of the data transmission network 1 and for configuring the data transmission network 1 according to the trained machine-learning model 6. Training the model 6 and configuring the data transmission network 1 may occur for example during an initial setup of the data transmission network 1 and/or after the data transmission network 1 has already been setup and functioning.

Figure 2:
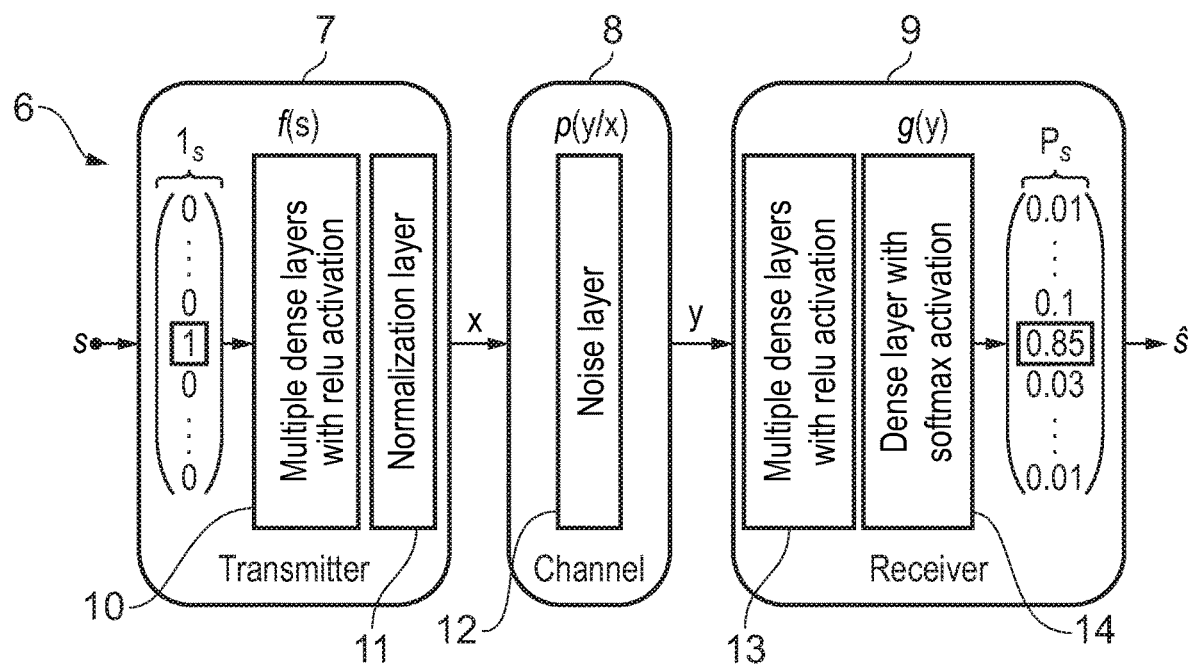
FIG. 2 is a block diagram of a machine-learning model of the data transmission network according to one embodiment.

FIG. 2 is a block diagram of a machine-learning model 6 of the data transmission network 1, used by the configuration device 5.

From a high-level perspective, each of the transmitter 22, communication channel 4 and receiver 31 of FIG. 1 transforms an input vector into an output vector, and can hence be modelled, at least partially, as a neural network. Since a chain of neural networks is again an even larger neural network, the configuration device 5 can model the entire data transmission network 1 by a neural network-based machine-learning model 6. The machine-learning model 6 can be trained from end-to-end as an auto-encoder, for example via stochastic gradient descent (SGD) for any differentiable loss function. By doing so, the configuration device 5 jointly optimize all of the individual components with respect to an end-to-end metric. This is fundamentally different from traditional system design where each component is individually optimized for its own sub-task.

Indeed, in the data transmission network 1, the transmitter 22 wants to communicate one out of M possible messages denoted by "s" to the receiver 31 making "n" uses of the channel 4. To this end, it applies the transformation "f(s)" to the message "s" to generate the transmitted signal "x", which is a vector of "n" dimensions. The hardware of the transmitter 22 may impose certain constraints on "x", e.g., the squared norm of "x" must be smaller than "n". The communication rate of the system 1 is "R=k/n" bit/channel use, where "k=log 2(M)". The channel 4 is described through the conditional probability density function "p(y|x)", where "y" denotes the received signal. Upon reception of "y", the receiver 31 applies the transformation "g(y)" to produce an estimate of the transmitted message.

From a machine-learning point of view, the communications system 1 can be seen as an auto-encoder. The goal of the auto-encoder is to find a representation "x" of "s" which is robust with respect to the perturbations created by the channel, so that it can reconstruct "s" based on "y".

More specifically, the machine-learning model 6 comprises a transmitter model 7, a channel model 8 and a receiver model 9.

The input of the machine-learning model 6 is an input vector s which specifies the message provided by the data source 21. The input vector s is encoded as a "one-hot" vector, i.e., an "M"-dimensional vector whose "s"th element is equal to 1 and all other elements are equal to zero.

The transmitter model 7 transforms an input vector s into a vector x: x=f(s)

The transmitter model 7 typically represents the encoding and some modulation features of the transmitter 22 and comprises a neural network (feed-forward network) which includes multiple dense layers 10 followed by a normalization layer 11. The multiple dense layers 10 include for example rectified linear unit (relu) activations. The normalization layer 11 is used to normalize the vector x in a way so that it is suitable for transmission by the transmitter hardware, e.g., comply with a maximum amplitude, power limit, etc. Accordingly, the normalization layer 11 applies a known transformation to its inputs, such as normalization to a predetermined norm, scaling of the elements to have unit absolute value, or convolution with a known filter. This layer has no trainable parameters but is used to satisfy the hardware constraints of the hardware transmitter 22.

The channel model 8 typically represents some modulation features of the transmitter 22, features of the channel 4 itself and some demodulation features of the receiver 31 and represents the relation between the transmitted vector x and the received signal y, for example based on a probability density function p(y|x). In some embodiments, the channel model 8 includes pulse shaping of the transmitter 22, a sequence of stochastic regularization layers 12, e.g., addition of Gaussian noise, convolution with 'L' random channel taps, impulse response, etc. These layers 12 have no trainable weights. The channel model 8 may include also at least one of: a random phase offset, frequency offset, sampling-frequency offset, quantization, and clipping. The channel model 8 provides a received signal y as a function of the vector x. The received signal y may be for example an IQ sample. Note that any other stochastic transformation could be used here to represent as accurately as possible the network and channel for which the system is trained.

The receiver model 9 typically represents some demodulation features of the receiver 31 and transforms a received signal y into an output vector ŝ which is an estimate of the input vector s: ŝ=g(y). The receiver model 9 comprises a neural network with multiple dense layers 13 followed by a layer 14 with softmax activations. The multiple dense layers 13 include for example rectified linear unit (relu) activations. The layer 14 has a softmax activation whose output "$p_s$" can be interpreted as a probability distribution over all possible messages, i.e., the elements of "$p_s$" are positive and sum-up to one. The decoded message corresponds then to the index of "$p_s$" with the highest probability.

In some embodiments, the transmitter model 7 comprises, in addition to a neural network, other processing modules such as source coding, upsampling and pulse shaping, digital to analogue conversion, mixer and amplifier, etc.

Similarly, in some embodiments, the receiver model 9 comprises, in addition to a neural network, other processing modules such as amplifier and down conversion, analogue to digital conversion, filtering and decimation, source decoding, etc.

For example, at the transmitter 22, the neural network generates complex modulated symbols that are then upsampled and filtered as in a traditional system. Similar options are possible for the receiver 31. This is useful for multi-carrier systems, such as OFDM, where neural networks could be used to generate complex symbols that are mapped to subcarriers with the help of an inverse Fourier transform (FFT). At the receiver 31, the neural network would then begin after the FFT (and cyclic prefix removal).

Importantly, even if only sub-parts of the transmitter 22 and receiver 31 are replaced by neural network layers, the system 1 is always optimized from end-to-end. This is very different from individual learning/training of sub-components.

The auto-encoder can be trained end-to-end using stochastic gradient descent. The training data is the set of all possible messages "s" in "M". A suitable loss function is the categorical cross-entropy.

Figure 3:
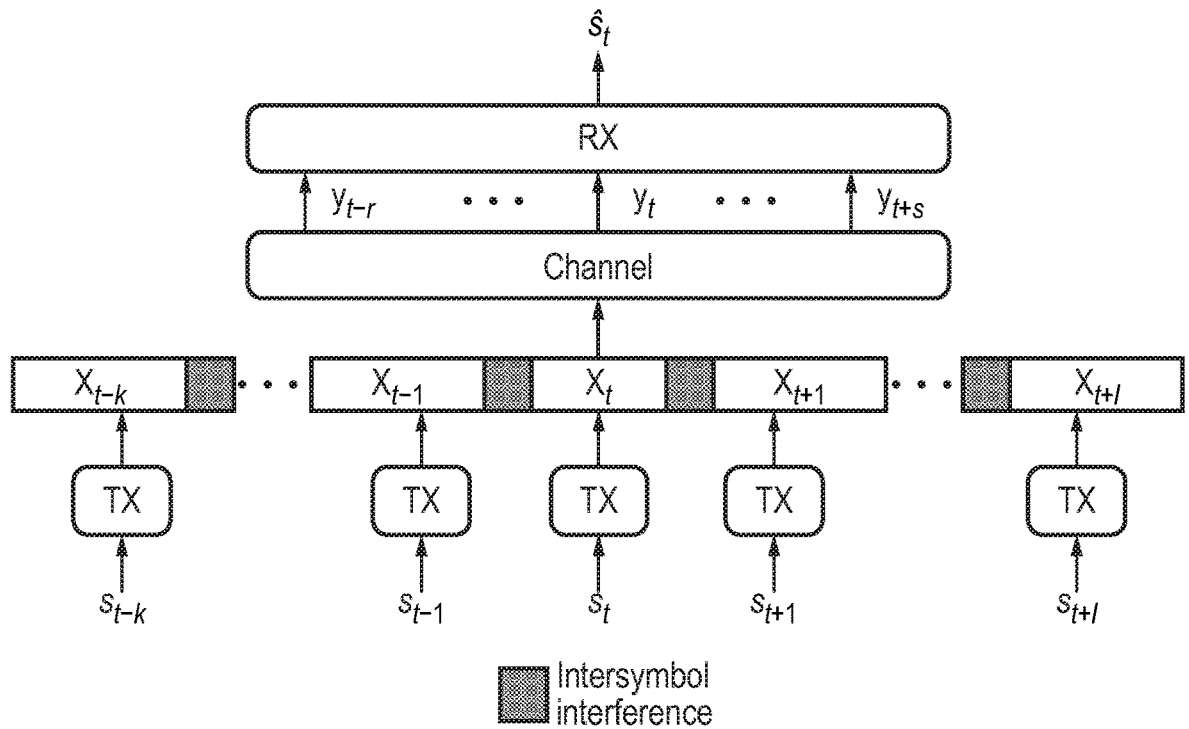
FIG. 3 illustrates a sequence of random messages provided to the machine-learning model of the data transmission network according to one embodiment.

As shown in FIG. 3, in embodiments, a sequence of random messages are provided to the transmitter model 7. In general, any number of messages in the sequence of random messages $S_{t-k}$ to $S_{t+1}$ may be provided. However, in this embodiment, a sequence of three random messages $S_{t-1}$ to $S_{t+1}$ is provided. The messages are concatenated together to form the sequence of messages. The transmitter model 7 transforms each message in the sequence of messages into a sequence of vectors for transmission. The sequence of vectors are provided to the channel model 8 where they interfere with each other. That is to say that symbols within the sequence of vectors interfere with each other so that symbols from one message in the sequence interfere with symbols from another message in the sequence. In this embodiment, the sequence of vectors are subjected to pulse shaping through a filtering function provided by the channel model 8. This pulse shaping results in inter-symbol interference which causes inter-message interference. That filtered sequence of vectors are also subjected to a channel impulse response through a convolution provided by the channel model 8.

This channel impulse response results in inter-symbol interference which causes inter-message interference. This results in inter-message interference which is generated by the channel model 8. The channel model also adds noise representative of the channel and the received sequence y is provided to the receiver model 9.

In this embodiment each message consists of "n" symbols, while subsequent messages are separated by "m<=n" symbols, i.e., there is an overlap of "n–m" symbols between adjacent messages. This is, for instance, the case when pulse shaping is applied to the transmitted signal or when the channel has memory. In this case, there is even interference between all adjacent symbols. The part "$y_{t-r}$" of the received sequence that contains useful information about "$x_t$" now also contains leaked signals from "$x_{t-1}$" and "$x_{t+1}$". It is fed into the receiver model 9 to recover the message "$s_t$" that was encoded in "$x_t$".

The receiver model 9 defines an observation window having a size $y_{t-r}$ to $y_{t+s}$ from which to recover the message $s_t$. The size of that observation window may be adjusted to improve decoding. Likewise, the location (its centre or its edges) of that observation window may be adjusted to improve decoding.

Figure 4:
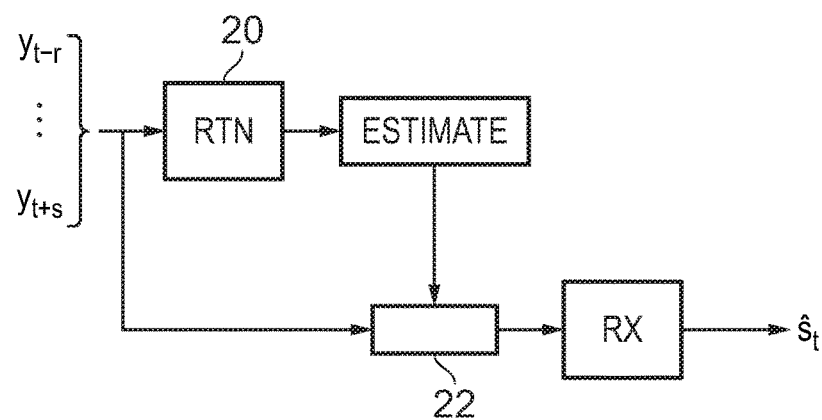
FIG. 4 illustrates adapting the machine-learning model of the data transmission network with one or more radio transformer networks according to one embodiment.

As shown in FIG. 4, the receiver model may be adapted with one or more radio transformer networks. These networks receive the sequence $y_{t-r}$ to $y_{t+s}$ and a neural network 20 obtains one or more of an estimated phase offset and channel impulse response. Correction logic 22 receive the sequence $y_{t-r}$ to $y_{t+s}$ and apply one or more of the estimated phase offset and channel impulse response to the sequence $y_{t-r}$ to $y_{t+s}$ and the corrected sequence is then provided to the remainder of the receiver model. The weights of the radio transformer networks are also updated based on the output of the receiver model during the learning and fine-tuning procedures.

After training on a stochastic channel model, the transmitter and receiver can be deployed on real hardware. Fine-tuning of the receiver can be applied to compensate for the discrepancies between the simulated and the real channel/hardware. The fine-tuning needs to be carried out on sequences of three subsequent messages.

Thanks to this learning procedure, the auto-encoder will learn to design message representations "$x_t$" that are not only robust with respect to channel impairments but also with respect to inter-message interference.

Figure 5:
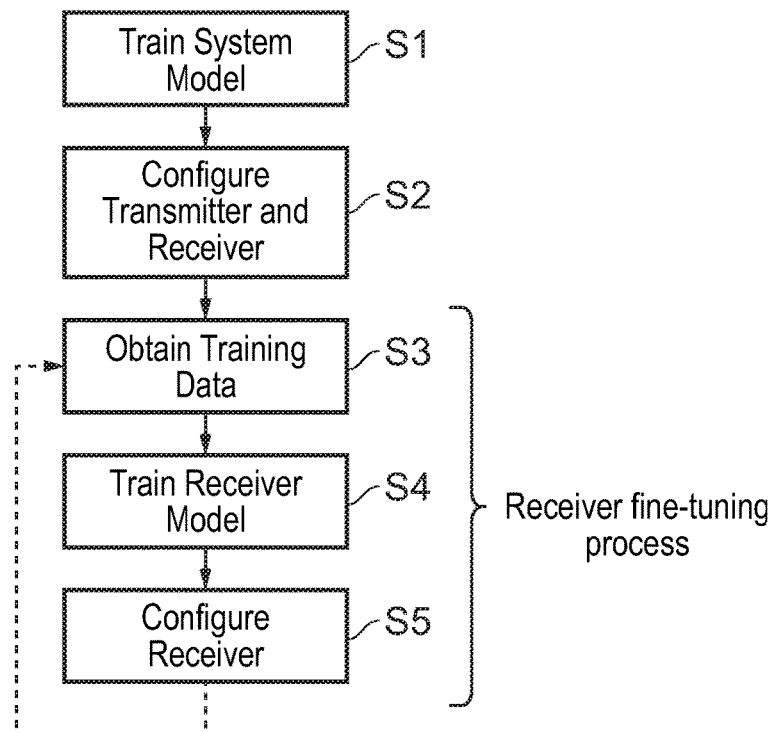
FIG. 5 is a flow chart of a method for configuring the data transmission network using the machine learning model according to one embodiment.

FIG. 5 is a flow chart of a method for configuring the data transmission network 1, executed by the configuration device 5, by using the machine learning model 6. First, the configuration device 5 trains the machine learning model 6 (step S1) as mentioned above. The machine learning model 6 can be trained end-to-end as an auto-encoder. The training data is a set of sequences of all possible messages "s" in "M". Training the machine learning model 6 may comprises determining weights by applying the stochastic gradient descent technique for a given differentiable loss function. A suitable loss function is the binary cross-entropy.

Then, the configuration device 5 configures the transmitter 22 and the receiver 31 according to the trained machine learning model 6 (step S2). Configuring a transmitter 22 may including deploying the neural network of the transmitter model 7, with its trained weights, in the configurable part of the transmitter 22. This may include for example the use of FPGA and/or a computer program and a processor. Similarly, configuring the receiver 31 may including deploying the neural network of the receiver and application model 9, with its trained weights, in the configurable part of the receiver 31. This may include for example the use of FPGA and/or a computer program and a processor.

Then, the transmitter 22 sends a plurality of sequences of messages "s" to the receiver 31. For example, the transmitter 22 generates a plurality of sequences of messages s as a function of random data. The receiver 31 stores the corresponding received signals y. The configuration device 5 obtains training data representative of the sent sequences of messages s and of the corresponding received signals y (step S3). For example, information about the sent sequences of messages is obtained from the transmitter 22, and information about the corresponding received signals y is obtained from the receiver 31. In some embodiments, such as described hereafter with reference to FIG. 6, techniques are used for identifying the sent messages at the receiver 31. Accordingly, the configuration device 5 may obtain the whole training data from the receiver 31, and communication with the transmitter 22 is not necessary at this step.

Then, the configuration device 5 trains the receiver model 9 according to the obtained training data (Step S4). More specifically, the receiver model 9 is trained based on the received signals y and corresponding sequences of messages "s". Training the receiver model 9 may comprises determining weights by applying the stochastic gradient descent technique for a given differentiable loss function. A suitable loss function is the binary cross-entropy.

Then, the configuration device 5 configures the receiver 22 according to the trained receiver model 9. As before, configuring the receiver 31 may including deploying the neural network of the receiver and application model 9, with its trained weights, in the configurable part of the receiver 31. This may include for example the use of FPGA and/or a computer program and a processor.

It should be noted that the weights of the transmitter model 7 remain unchanged during steps S3 to S5.

Steps S3 to S5 may be repeated to take varying channel condition (e.g. due to temperature changes, fog, etc) into account.

In the network 1, the transmission of data is optimized end-to-end by training a machine learning model 6. This improves the efficiency of the data transmission.

During the initial training of the machine learning model 6 as an auto-encoder (step S1), a channel model 8 is used. This allows determining the gradient of the channel model 8 for training. However, the channel model 8 may not represent the channel 4 perfectly, and this impacts the performance of the data transmission network 1.

Accordingly, the configuration device 5 performs a receiver fine-tuning process (Steps S3 to S5). This improves the performances of the data transmission network 1 by taking the real channel 4 into account. Repeating the receiver fine-tuning process allow taking varying channel condition into account, for example in real time.

Also, the concept has significant implications for physical layer security as it is very difficult for an eavesdropper to extract useful information from the transmitted signal because it does not correspond to any known modulation/coding scheme.

Figure 6:
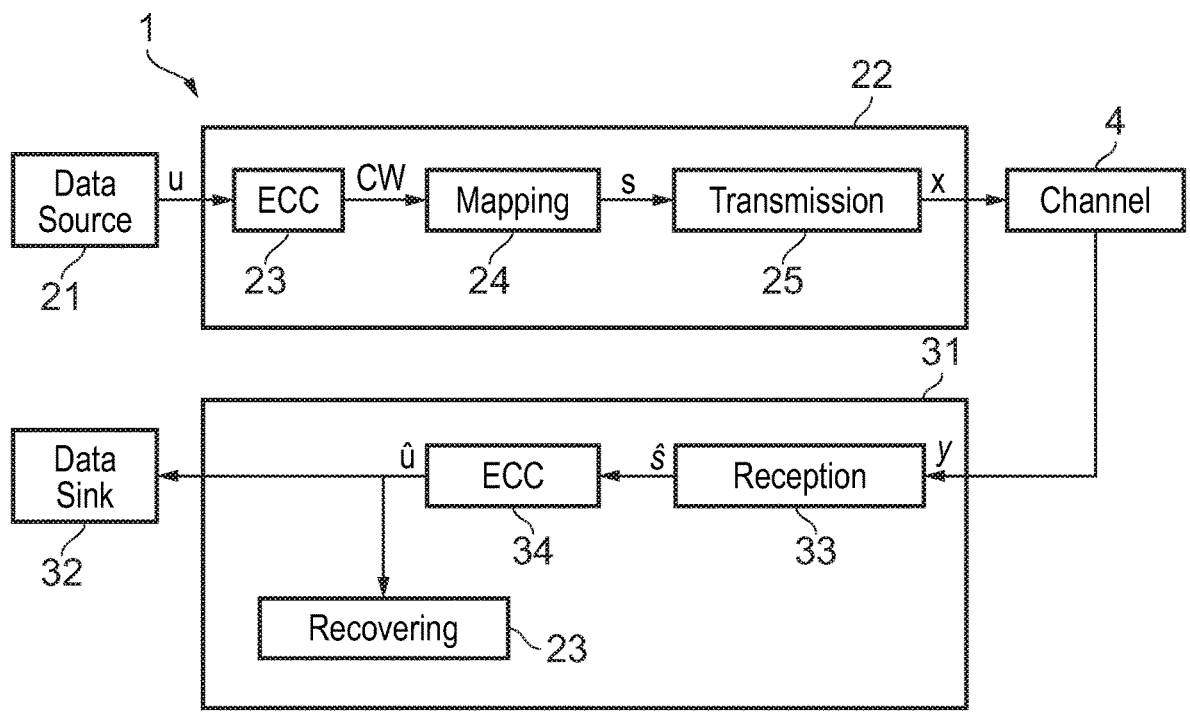
FIG. 6 is a functional view of the data transmission network 1 according to one embodiment.

FIG. 6 is a functional view of the data transmission network 1, in an embodiment wherein the receiver 31 is configured for recovering labelled training data for the receiver fine-tuning process.

Indeed, after the initial configuration of the data transmission network 1 based on steps S1 to S5, the receiver 3i is susceptible to channel alterations over time, because the receiver model 9 was trained for the exact channel conditions at the time of training data measurements. To ensure that the receiver 3i can handle channel alterations over time it is helpful to perform the fine-tuning process periodically.

Therefore, this embodiment proposes a method to fine-tune the receiver model 9 adaptively in real-time such that it can handle fluctuating channel conditions (e.g., fog in a wireless backhaul channel). Thus, slightly drifting channel parameters (e.g., temperature drift) can be compensated via fine-tuning parallel to the data transmission. The configuration device 5 can do the fine-tuning training of the receiver model 9 in parallel without interrupting the data transmission. Whenever new weights are available for the receiver model 9, the receiver 31 can be configured with these values and therefore the receiver 31 is adapted to the current channel conditions.

As supervised training always requires a labelled training dataset (i.e., the originally transmitted message (bits or IQ-samples) that must be known at the receiver side, which is typically not the case due to the presence of noise), the present embodiment proposes a method to circumvent this problem and to acquire labelled training data during runtime directly from the received signal.

Accordingly, in this embodiment, the transmitter 22 comprises an error correction module 23, a mapping module 24 and a transmission module 25, and the receiver 31 comprises a reception module 33, an error correction module 34 and a recovering module 35.

The data source 21 provides input data u to the transmitter 22.

The error correction module 23 determines a codeword CW of N bits as a function of the input data, by applying an error correction code (ECC). Examples of suitable ECC include LDPC, turbo codes, polar codes, etc.

The mapping module 24 maps the codeword CW to a sequence of $N/\log_2(M)$ messages, wherein M is the number of possible messages.

The successive sequences of messages are respectively encoded as "one-hot" vector s and processed by the transmission module 25, which has been configured according to the trained transmitter model 7, to determine a transmitted signal x.

The successive received signals y are processed by the reception module 33, which has been configured according to the trained received model 9, to determine respective output vectors ŝ identifying the received messages. The sequences of messages at the receiver 31 may be different from the sequences of messages at the transmitter 22, due to transmission errors.

Accordingly, the error correction module 34 determines the output data û by decoding the error correction codes applied by the error correction module 23 to the received sequence of messages.

The input data u and the output data û are identical. Accordingly, the recovering module 35 can recover the transmitted messages (specified by input vectors s) associated with the respective received signals y.

By using training data comprising the recovered input vectors s and corresponding received signals y for labelled training, the configuration device 5 determines an updated received model 9 (e.g. including new weights) and configures the receiver 31 according to the updated received model 9.

The embodiment of FIG. 5 allows obtaining training data for the receiver fine-tuning process, without the need of a communication between the configuration device 5 and the transmitter 22. Obtaining the training data does not requires interruption of the communication between the transmitter 22 and the receiver 31 and does not requires the transmission of pilot symbols which would cause rate loss.

Figure 7:
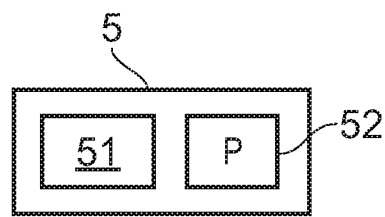
FIG. 7 is structural view of the configuration device according to one embodiment.

FIG. 7 is a structural view of the configuration device 5, which present the general architecture of a computer. The configuration device 5 comprises a processor 51 and a memory 52. The memory 52 stores a computer program P which, when executed by the processor 51, causes the configuration device 5 to execute the method described above with reference to FIGS. 2 to 6.

In some embodiments, the configuration device 5 is collocated with or part of the source device 2 or destination device 3.

As mentioned above, end-to-end machine learning communications systems are a new paradigm for communications system design. They allow learning of new physical layer transceiver architectures from scratch without any preimposed constructs such as coding, modulation, waveforms, etc. In the machine learning parlance, any communications system can be described as an auto-encoder (because the output should be the same as the input) and can hence be represented and trained as a deep neural network. Embodiments provide a method to enable learning of an end-to-end communications system that can transmit and receive continuous sequences of messages. This is unlike existing systems which consist of training the neural network for a stochastic channel model without inter-message interference. However, in those existing systems, if the resulting communications system is used to transmit continuous sequences of messages, performance rapidly degrades.

In embodiments, we represent an end-to-end communications system consisting of a transmitter, a channel and, a receiver through a single deep neural network (auto-encoder) in which the channel takes the form of a stochastic regularization layer, i.e., it carries out a known stochastic transformation of the data. The neural network is trained using stochastic gradient descent until a desired training performance is achieved. In embodiments, the transmitter does not only generate a single message "x_t" (as in existing approaches), but rather at least two messages and typically three messages, i.e., the previous and subsequent messages "x_{t−1}" and "x_{t+1}", respectively. This sequence of messages goes through a channel, possibly with memory, and the receiver looks at the portion "y_t" of this sequence that contains useful information about the message "x_t". Based on this observation the receiver tries to decode the message.

Existing approaches are based on training on single messages that do not interfere, i.e. they are sufficiently separated in time. This causes a significant rate loss which is unacceptable for any practical implementation. Embodiments make end-to-end training of neural network-based communications systems practically feasible as it allows for continuous transmission of message sequences that potentially interfere.

In embodiments, the receiver neural network provides as its output a vector corresponding to a probability distribution over all possible messages (this is often called a probability vector). The decoded message is then simply the index of the element of this vector with the largest entry. However, in order to update the machine learning model (e.g., by stochastic gradient descent) embodiments use the entire output vector to compute the cross-entropy between the output and the one-hot encoded input (which is also a probability vector because only one element is equal to one and all others are zero) and not just the index.

In embodiments, the estimation of the characteristics of the sequence of received symbols is generally carried out by additional neural networks (or neural network layers) within the receiver. Their weights are updated during the same end-to-end training (or fine-tuning) process to simultaneously improve the estimation as well as classification performance.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for configuring a data transmission network, executed by a configuration device, wherein said data transmission network comprises a transmitter, a receiver, and a communication channel between said transmitter and said receiver, said method comprising:
    training a machine learning model of said data transmission network, wherein said machine learning model comprises at least a transmitter model including a transmitter neural network, a channel model, and a receiver model including a receiver neural network, wherein said training comprises:
        providing a message within a sequence of messages;
        generating a group of transmission symbols for each message in said sequence of messages using said transmitter neural network;
        concatenating said groups of transmission symbols together as a sequence of transmission symbols;
        simulating transmission of said sequence of transmission symbols over said communication channel using said channel model to said receiver;
        analysing a sequence of received symbols using said receiver neural network to generate a decoded message; and
        updating said machine learning model based on an output of said receiver neural network, wherein said training further comprises applying an inter-symbol interference function of said channel model to said sequence of transmission symbols to generate inter-message interference symbols as said sequence of received symbols.

2. The method of claim 1, wherein said applying comprises applying a first inter-symbol interference function to said sequence of transmission symbols to generate first inter-message interference symbols as said sequence of received symbols.

3. The method of claim 2, wherein said first inter-symbol interference function comprises a pulse-shaping function.

4. The method of claim 2, wherein said applying comprises applying a second inter-symbol interference function to said sequence of transmission symbols to generate second inter-message interference symbols as said sequence of received symbols.

5. The method of claim 4, wherein said second inter-symbol interference function comprises a convolution with a channel impulse response.

6. The method of claim 1, wherein said applying comprises applying a first inter-symbol interference function to said sequence of transmission symbols to generate first inter-message interference symbols and applying a second inter-symbol interference function to said first inter-message interference symbols to generate second inter-message interference symbols as said sequence of received symbols.

7. The method of claim 1, wherein said analysing comprises setting an observation window within said sequence of received symbols and classifying that portion of said sequence of received symbols falling within said observation window.

8. The method of claim 7, wherein said training further comprises adjusting at least one of a location and a size of said observation window to maximise a classification accuracy of said decoded message.

9. The method of claim 1, wherein said method is performed by a transmitter of a source device, a receiver of a destination device, or a configuration device for said data transmission network.

10. The method of claim 1, wherein said training further comprises estimating a characteristic of said sequence of received symbols using an characteristic estimating neural network, applying a compensation function to said sequence of received symbols based on said characteristic to generate compensated received symbols and analysing said compensated received symbols using said receiver neural network to generate said decoded message.

11. A method for configuring a data transmission network, executed by a configuration device, wherein said data transmission network comprises a transmitter, a receiver, and a communication channel between said transmitter and said receiver, said method comprising:
training a machine learning model of said data transmission network, wherein said machine learning model comprises at least a transmitter model including a transmitter neural network, a channel model, and a receiver model including a receiver neural network, wherein said training comprises:
providing a message within a sequence of messages;
generating a group of transmission symbols for each message in said sequence of messages using said transmitter neural network;
concatenating said groups of transmission symbols together as a sequence of transmission symbols;
simulating transmission of said sequence of transmission symbols over said communication channel using said channel model to said receiver;
analysing a sequence of received symbols using said receiver neural network to generate a decoded message, wherein said analysing comprises setting an observation window within said sequence of received symbols and classifying that portion of said sequence of received symbols falling within said observation window; and
updating said machine learning model based on an output of said receiver neural network, wherein said training further comprises adjusting at least one of a location and a size of said observation window to maximise a classification accuracy of said decoded message.

12. An apparatus, comprising:
at least one processor; and
at least one memory storing instructions that, when executed by said at least one processor, cause said apparatus to perform a set of operations including training a machine learning model of a data transmission network comprising a transmitter, a receiver, and a communication channel between said transmitter and said receiver, wherein said machine learning model comprises at least a transmitter model including a transmitter neural network, a channel model, and a receiver model including a receiver neural network, wherein said training comprises:
providing a message within a sequence of messages;
generating a group of transmission symbols for each message in said sequence of messages using said transmitter neural network;
concatenating said groups of transmission symbols together as a sequence of transmission symbols;
simulating transmission of said sequence of transmission symbols over said communication channel using said channel model to said receiver;
analysing a sequence of received symbols using said receiver neural network to generate a decoded message; and
updating said machine learning model based on an output of said receiver neural network, wherein the training further comprises applying an inter-symbol interference function of said channel model to said sequence of transmission symbols to generate inter-message interference symbols as said sequence of received symbols.

13. The apparatus of claim 12, wherein said applying comprises applying a first inter-symbol interference function to said sequence of transmission symbols to generate first inter-message interference symbols as said sequence of received symbols.

14. The apparatus of claim 13, wherein said first inter-symbol interference function comprises a pulse-shaping function.

15. The apparatus of claim 13, wherein said applying comprises applying a second inter-symbol interference function to said sequence of transmission symbols to generate second inter-message interference symbols as said sequence of received symbols.

16. The apparatus of claim 15, wherein said second inter-symbol interference function comprises a convolution with a channel impulse response.

17. The apparatus of claim 12, wherein said applying comprises applying a first inter-symbol interference function to said sequence of transmission symbols to generate first inter-message interference symbols and applying a second inter-symbol interference function to said first inter-message interference symbols to generate second inter-message interference symbols as said sequence of received symbols.

18. The apparatus of claim 12, wherein said analysing comprises setting an observation window within said sequence of received symbols and classifying that portion of said sequence of received symbols falling within said observation window.

19. The apparatus of claim 18, wherein said training further comprises adjusting at least one of a location and a size of said observation window to maximise a classification accuracy of said decoded message.

20. The apparatus of claim 12, wherein said training further comprises estimating a characteristic of said sequence of received symbols using an characteristic estimating neural network, applying a compensation function to said sequence of received symbols based on said characteristic to generate compensated received symbols and analysing said compensated received symbols using said receiver neural network to generate said decoded message.

* * * * *